United States Patent
Jeon et al.

(10) Patent No.: US 9,623,640 B2
(45) Date of Patent: Apr. 18, 2017

(54) MULTILAYER SEPARATOR WITH SUPERIOR PERMEABILITY

(71) Applicant: SK Innovation Co., Ltd., Seoul (KR)

(72) Inventors: Min Ho Jeon, Daejeon (KR); Byoung Cheon Jo, Daejeon (KR); Sang Bae Cheong, Daejeon (KR); Sang Hyun Park, Daejeon (KR); Tae Gyu Kan, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 160 days.

(21) Appl. No.: 14/580,885

(22) Filed: Dec. 23, 2014

(65) Prior Publication Data

US 2015/0183195 A1 Jul. 2, 2015

(30) Foreign Application Priority Data

Dec. 27, 2013 (KR) .................. 10-2013-0165751
Dec. 16, 2014 (KR) .................. 10-2014-0181482

(51) Int. Cl.

| | |
|---|---|
| B29D 7/01 | (2006.01) |
| B32B 27/32 | (2006.01) |
| B29D 99/00 | (2010.01) |
| B32B 27/08 | (2006.01) |
| B29K 23/00 | (2006.01) |
| B29L 9/00 | (2006.01) |
| B29L 31/34 | (2006.01) |

(52) U.S. Cl.
CPC .............. B32B 27/32 (2013.01); B29D 7/01 (2013.01); B29D 99/005 (2013.01); B32B 27/08 (2013.01); B29K 2023/04 (2013.01); B29K 2023/12 (2013.01); B29L 2009/00 (2013.01); B29L 2031/3468 (2013.01); B32B 2250/242 (2013.01); B32B 2250/42 (2013.01); B32B 2307/724 (2013.01); B32B 2457/10 (2013.01); Y10T 428/31913 (2015.04)

(58) Field of Classification Search
None
See application file for complete search history.

(56) References Cited

U.S. PATENT DOCUMENTS

| | | | | |
|---|---|---|---|---|
| 5,540,929 A | * | 7/1996 | Narayan | ................. C08B 31/04 424/422 |
| 5,565,281 A | * | 10/1996 | Yu | ........................ B29C 55/005 429/145 |
| 2003/0136500 A1 | * | 7/2003 | Yu | ........................... B32B 27/32 156/229 |
| 2006/0167169 A1 | * | 7/2006 | Arana | ..................... C08L 23/06 524/515 |
| 2007/0018141 A1 | * | 1/2007 | Kepler | ..................... H01B 1/06 252/500 |

* cited by examiner

Primary Examiner — Michael J Feely
(74) Attorney, Agent, or Firm — The Webb Law Firm

(57) ABSTRACT

Provided are a multilayer separator capable of improving interlayer peel strength and exhibiting excellent permeability due to a high degree of alignment, and a method of manufacturing the same. The method of manufacturing a multilayer separator includes: manufacturing a precursor film by co-extruding and molding a polypropylene based resin melt having a melt index (2.16 kg, 230° C.) of 0.3 to 5 g/10 min and a polyethylene based resin melt having a melt index (2.16 kg, 190° C.) of 0.1 to 1.5 g/10 min so as to be alternately laminated; and heat-treating and stretching the manufactured film, wherein a melt index ratio (A/B) of the polypropylene based resin melt (A) and polyethylene based resin melt (B) is 2 to 10.

3 Claims, No Drawings

MULTILAYER SEPARATOR WITH SUPERIOR PERMEABILITY

CROSS-REFERENCE TO RELATED APPLICATIONS

This application claims priority under 35 U.S.C. §119 to Korean Patent Application No. 10-2013-0165751, filed on Dec. 27, 2013, and No. 10-2014-0181482, filed on Dec. 16, 2014, in the Korean Intellectual Property Office, the disclosures of which are hereby incorporated in their entirety by reference.

TECHNICAL FIELD

The following disclosure relates to a multilayer separator with superior permeability and a method of manufacturing the same.

BACKGROUND

A polyolefin microporous film has been widely used as a separator for various batteries such as primary and secondary lithium batteries, a lithium-polymer battery, a nickel-hydrogen battery, a nickel-cadmium battery, a nickel-zinc battery, and the like, a filter, a filter for separation, a separation membrane for micro-filtration, or the like. In the case in which the polyolefin microporous film is used as the separator for various batteries, performance of the separator is an important factor in properties, productivity, and stability of a battery. Therefore, the separator should have suitable mechanical properties, heat resistance, permeability, dimensional stability, and shutdown characteristics, and the like.

As a method of manufacturing a microporous film from polyolefin, there are a method of manufacturing a thin fiber using polyolefin to form a microporous film in a non-woven fabric form, a dry method of manufacturing a thick polyolefin film and then stretching the thick polyolefin film to form fine pores, and a wet method of kneading polyolefin with diluent to form a single phase and extracting a diluent portion after phase separation to form pores in a polyolefin film. Among them, in the wet method, a thin film having a thin and uniform thickness may be manufactured, and excellent physical properties may be implemented as compared to the other two methods, such that the wet method is suitable for a method of manufacturing a separator for a secondary battery.

The polyolefin microporous film is mainly used in a multilayer form for mechanical properties. For example, a polypropylene/polyethylene/polypropylene triple-layered separator has been used. This triple-layered separator is manufactured by separately manufacturing precursor films of respective layers, forming a multilayer film by a lamination method, and then stretching the multilayer film. Since in the separator manufactured as described above, each of the layers are not stretched under suitable conditions, such that there is a limitation in increasing permeability as compared to a single layer product, and it is difficult to thin the separator. Further, in the case of forming a multilayer separator by the lamination method, a separate lamination process should be performed, such that a process becomes complicated, and production cost is increased.

Therefore, a co-extrusion method of simultaneously extruding molten resins of the respective precursor films using two or more extruders to laminating a plurality of films in a molten state is used. This method may omit the lamination process, such that a process may be shortened. In addition, interlayer peel strength may be increased.

However, at the time of manufacturing a multilayer separator such as the triple-layered separator using the co-extrusion method, it is difficult to manufacture a precursor film having a high degree of alignment. Therefore, at the time of performing a stretching process, a stretching effect may be deteriorated, such that permeability of a final separator may be decreased, and
1 properties may be deteriorated.

SUMMARY

An embodiment of the present invention is directed to providing a multilayer separator capable of significantly improving permeability while simultaneously decreasing a thickness of a thin film without deterioration of physical properties.

Another embodiment of the present invention is directed to providing a method of manufacturing a multilayer separator capable of reducing a process to increase productivity.

In one general aspect, a method of manufacturing a multilayer separator includes: manufacturing a precursor film by co-extruding and molding a polypropylene based resin melt having a melt index (2.16 kg, 230° C.) of 0.3 to 5 g/10 min and a polyethylene based resin melt having a melt index (2.16 kg, 190° C.) of 0.1 to 1.5 g/10 min so as to be alternately laminated; and heat-treating and stretching the manufactured film, wherein a melt index ratio (A/B) of the polypropylene based resin melt 00 and polyethylene based resin melt (B) is 2 to 10.

A process of molding the precursor film may be performed in a range in which a draw down ratio is 100 to 450.

In the manufacturing of the precursor film, a molding process may be performed in a range in which a draw down speed of the resin melt is 160 to 3,000 (l/sec).

In another general aspect, a multilayer separator is manufactured by the method as described above.

Air permeability (Gurley, sec) per unit thickness (µm) of the multilayer separator may be 19.2 sec/µm or less.

DETAILED DESCRIPTION OF EMBODIMENTS

Hereinafter, a method of manufacturing a multilayer separator according to the present invention, and a multilayer separator manufactured using the same will be described in detail. The accompanying Examples and drawings to be described below are provided by way of example so that the idea of the present invention can be sufficiently transferred to those skilled in the art to which the present invention pertains. In addition, technical terms and scientific terms used in the present specification have the general meaning understood by those skilled in the art to which the present invention pertains unless otherwise defined, and a description for the known function and configuration obscuring the gist of the present invention will be omitted in the following description and the accompanying drawings.

The present inventors found that at the time of alternatively laminating a polyethylene based resin and a polypropylene based resin to manufacture a multilayer separator with three layers or more, a multilayer separator capable of having superior permeability depending on a high degree of alignment while simultaneously improving interlayer peel strength may be manufactured by adjusting a melt index ratio of respective resins to co-extrude and mold the resins, thereby completing the present invention.

The method of manufacturing a multilayer separator includes: manufacturing a precursor film by co-extruding and molding a polypropylene based resin melt having a melt index (2.16 kg, 230° C.) of 0.3 to 5 g/10 min and a polyethylene based resin melt having a melt index (2.16 kg, 19013) of 0.1 to 1.5 g/10 min so as to be alternately laminated; and heat-treating and stretching the manufactured film, wherein a melt index ratio (A/B) of the polypropylene based resin melt (A) and polyethylene based resin melt (B) is 2 to 10.

In the present invention, a multilayer separator may be manufactured by co-extruding and molding each of the resin melts using a blown- or casting-type molding machine.

The resin melts may be laminated in a multilayer structure of three layers or more by adjusting a shape of a die at the time of co-extrusion. For example, the resin melts may be laminated in an A/B/A or B/A/B triple layer structure, an A/B/A/B quadruple layer structure, or an A/B/A/B/B or B/A/B/A/B quintuple layer structure. Preferably, the multilayer separator may be a polypropylene based resin (A)/ polyethylene based resin (B)/polypropylene based resin (A) triple-layered separator or polyethylene based resin(B)/polypropylene based resin (A)/polyethylene based resin (B) triple-layered separator.

The multilayer separator according to the present invention may be manufactured by co-extruding and molding each of the resin melts using the blown- or casting-type molding machine in a form of a multilayer film.

In this case, moldability at the time of extrusion and stretching and permeability may be improved by adjusting the melt index ratio (A/B) of the polypropylene based resin melt (A) and the polyethylene based resin melt (B). The melt index ratio (A/B) may be 2 to 10, preferably 3 to 10.

In the case in which the melt index ratio (A/B) is less than 2, moldability and productivity may be deteriorated, and in the case in which the melt index ratio (A/B) is more than 10, permeability may be deteriorated.

Further, in the present invention, at the time of extruding and molding the precursor film using the blown- or casting-type molding machine, moldability and permeability may be improved by adjusting a draw down ratio of extrudates. In this case, the draw down ratio is in a range of 100 to 450. Preferably, the draw down ratio may be 120 to 300.

As used herein, the term "draw down ratio (DDR)" indicates a stretching ratio in a machine direction at the time of extruding and molding the film and is defined by the following Equation 1.

$$\text{Draw down ratio (DDR)} = D/t \times 1000 \quad \text{[Equation 1]}$$

(In Equation 1, D (mm) is a die gap, and T (μm) is a thickness of a film.)

In the case in which the draw down ratio is less than 100, permeability may be deteriorated, and in the case in which the draw down ratio is more than 450, moldability may be deteriorated.

According to the present invention, interlayer peel strength of the separator may be improved by a combination of a configuration of adjusting the draw down ratio within the above mentioned range and a configuration of adjusting the melt index ratio of the polypropylene based resin and the polyethylene based resin, and at the same time, excellent permeability due to a high degree of alignment may be implemented.

According to the present invention, permeability and moldability may be improved by adjusting a draw down speed of the melt at the time of co-extrusion. In this case, the draw down speed of the melt may be in a range of 160 to 3,000 (l/sec). Preferably, the draw down speed of the melt may be in a range of 250 to 2,500 (l/sec).

As used herein, the term "draw down speed (DDS)" of the melt indicates a stretching speed in the machine direction at the time of extruding and molding the film and is defined by the following Equation 2.

$$DDS(l/sec) = D/t \times 1000 \times V_f/(2 \times d)/60 = DDR \times V_f/(120 \times d) \quad \text{[Equation 2]}$$

(In Equation 2, D (mm) is a die gap, t (μm) is a thickness of a film, $V_f$ (m/min) is a final winding speed of the film, and d (m) is a distance from a die exit to a frost line of the film.)

In the case in which the draw down speed is less than 160 (l/sec), permeability may be deteriorated, and in the case in which the draw down speed is more than 3,000 (l/sec), moldability may be deteriorated.

According to the present invention, interlayer peel strength of the separator may be improved by a combination of a configuration of adjusting the draw down speed of the melt within the above mentioned range and a configuration of adjusting the melt index ratio of the polypropylene based resin and the polyethylene based resin, and at the same time, excellent, permeability due to a high degree of alignment may be implemented.

In addition, according to the present invention, permeability may be improved due to an increase in the degree of alignment and moldability may be improved by a combination of a configuration of adjusting the melt index of each of the polypropylene based resin and the polyethylene based resin and the melt index ratio thereof and the configuration of adjusting the draw down speed of the melt and the draw down ratio of the film at the time of co-extruding as described above.

In the present invention, as the polypropylene based resin, any one selected from the group consisting of homo polypropylene, random polypropylene, impact polypropylene, and a mixture thereof may be used, but the present invention is not limited thereto.

A polypropylene based resin having a melt index (2.16 kg, 230° C.) of 0.3 to 5 g/10 min may be used. In the case in which the melt index is less than 0.3 g/10 min, extrusion moldability may be deteriorated, and in the case in which the melt index is more than 5 g/10 min, permeability may be deteriorated.

In the present invention, as the polyethylene based resin, any one selected from the group consisting of low density polyethylene, linear low density polyethylene, high density polyethylene and a mixture thereof may be used, but the present invention is not limited thereto.

Since it is difficult to allow the polyethylene based resin to have a high degree of alignment as compared to the polypropylene based resin, in the case of using a polyethylene based resin having a high molecular weight, at the time of combining with the polypropylene based resin layer and laminating, interlayer peel strength may be improved, and permeability may be significantly improved by a heat treatment and stretching process performed after a co-extrusion process.

In addition, as the polyethylene based resin, a polyethylene based resin having a melt index (2.16 kg, 190° C.) of 0.1 to 1.5 g/10 min may be used. In the case in which the melt index is less than 0.1 g/10 min, extrusion moldability may be deteriorated, and in the case in which the melt index is more than 1.5 g/10 min, permeability may be deteriorated.

In the present invention, permeability may be improved by sequentially performing the heat treatment and stretching process on the precursor multilayer film manufactured by a co-extrusion and molding process to increase the degree of alignment.

The heat treatment may be performed in a temperature range of 50° C. below a melting temperature ($T_{bm}$) of a material having the lowest melting temperature among raw materials configuring the multilayer film to the melting temperature ($T_{bm}$) (that is, $T_{bm}$–50° C. to $T_{bm}$) for 1 minute to 72 hours. In the case in which a temperature is lower than the above-mentioned temperature range, a heat treatment effect may not be sufficient, such that permeability may be deteriorated, and in the case in which the temperature is higher than the temperature range, crystals and alignment of the crystals may be damaged, such that it may be difficult to form pores.

In the present invention, after the heat treatment, the stretching process of the multilayer film may be performed. In the stretching process, a tentering method, a rolling method, a calendaring method, or the like, may be used, but the present invention is not limited thereto. Among them, monoaxial stretching in the machine direction by the rolling method may be preferable. In this case, it is preferable that the stretching process is performed at a low temperature and then performed again at a high temperature.

A temperature range of the low temperature may be from 200° C. below the melting temperature ($T_{bm}$) of a material having the lowest melting temperature among raw materials configuring the multilayer film manufactured in the molding process to 30° C. below the melting temperature ($T_{bm}$) (that is, $T_{bm}$–200° C. to $T_{bm}$–30° C.). In the case in which the temperature is out of the above-mentioned range, mobility of an amorphous portion may become excessively low or high, such that initial pores may not be smoothly formed due to a cleavage between crystals.

In addition, a temperature range of the high temperature may be from 30° C. below the melting temperature ($T_{bm}$) of the material having the lowest melting temperature among the raw materials configuring the multilayer film manufactured in the molding process to 1° C. below the melting temperature ($T_{bm}$) (that is, $T_{bm}$–30° C. to $T_{bm}$–1° C.). In the case in which the temperature is lower than the above-mentioned temperature range, a shrinkage ratio of the separator may be excessively increased, and in the case in which the temperature is higher than the above-mentioned range, a crystal structure may be damaged, such that permeability may be deteriorated.

The multilayer separator according to the present invention may be manufactured by the above-mentioned method, and air permeability (Gurley, sec) per unit thickness may be 19.2 sec/μm or less. The air permeability (Gurley, sec) per unit thickness of the multilayer separator according to the present invention may be preferably 17.3 sec/μm or less, and more preferably 13.8 sec/μm or less.

Hereinafter, Examples will be provided in order to describe the present invention in more detail. However, the present invention is not limited to the following Examples.

Example 1

A multilayer film with three layers of polypropylene resin/polyethylene resin/polypropylene resin was manufactured by a co-extruding and casting-molding method using a polypropylene resin having a melt index (2.16 kg, 230° C.) of 2.0 g/10 min and a polyethylene resin having a melt index (2.16 kg, 190° C.) of 0.7 g/10 min. In this case, a die gap was 3 mm, a thickness of a cast precursor film was 15 μm, and a draw down ratio was adjusted to 200. A thickness ratio between layers of the formed three layer precursor film was 1:1:1. A final winding speed of the precursor film was adjusted to 30 m/min, a distance from a die exit to a frost line of the melt was 10 cm, and a draw down speed at the time of casting was 500 l/sec. The precursor film manufactured as described above was heat treated at 125° C. for 12 hours. The heat treated film was stretched by 25% at a cool stretching temperature of 25° C. in a machine direction and then stretched by 160% at a hot stretching temperature of 120° C. in the machine direction. Air permeability (Gurley, sec) per unit thickness of the separator manufactured as described above was 15.7 sec/μm. Here, air permeability per unit thickness (μm), which was measured using a Gurley densometer (ToyoSeiki), was measured as a time (second) required for passing of all of the dried air (100 cc) at the time of passing air having a predetermined volume (100 ml) through a predetermine area (1 inch$^2$) at a predetermined pressure (0.05 kgf/cm$^2$).

Example 2

A separator was manufactured by the same process as that in Example 1 except for using a polypropylene resin having a melt index (2.16 kg, 230° C.) of 3.0 g/10 min and a polyethylene resin having a melt index (2.16 kg, 190° C.) of 0.35 g/10 min. Air permeability (Gurley, sec) per unit thickness of the separator manufactured as described above was 11.1 sec/μm.

Example 3

A separator was manufactured by the same process as that in Example 1 except that a polypropylene resin having a melt index (2.16 kg, 230° C.) of 2.0 g/10 min and a polyethylene resin having a melt index (2.16 kg, 190° C.) of 0.35 g/10 min were used, a die gap was 4.5 mm, a thickness of a precursor film was 10 μm, and a final winding speed of the precursor film was adjusted to 75 m/min. Air permeability (Gurley, sec) per unit thickness of the separator manufactured as described above was 9.9 sec/μm.

Example 4

A separator was manufactured by the same process as that in Example 3 except that a die gap was 3.0 mm, a thickness of a precursor film was 25 μm, a final winding speed of the precursor film was adjusted to 30 m/min, and a distance of from a die exit to a frost line was 12 cm. Air permeability (Gurley, sec) per unit thickness of the separator manufactured as described above was 19.2 sec/μm.

Comparative Example 1

A separator was manufactured by the same process as that in Example 1 except for using a polypropylene resin having a melt index (2.16 kg, 230° C.) of 4.0 g/10 min and a polyethylene resin having a melt index (2.16 kg, 190° C.) of 0.35 g/10 min. Air permeability (Gurley, sec) per unit thickness of the separator manufactured as described above was 81.7 sec/μm.

Comparative Example 2

A separator was manufactured by the same process as that in Example 1 except for using a polypropylene resin having a melt index (2.16 kg, 230° C.) of 1.5 g/10 min and a polyethylene resin having a melt index (2.16 kg, 190° C.) of 1.0 g/10 min. Air permeability (Gurley, sec) per unit thickness of the separator manufactured as described above was 57.5 sec/μm.

Example 5

A separator was manufactured by the same process as that in Example 3 except that a die gap was 3.0 mm, a thickness of a precursor film was 33 μm, and a final winding speed of the precursor film was adjusted to 66 m/min. Air permeability (Gurley, sec) per unit thickness of the separator manufactured as described above was 24.7 sec/μm.

Example 6

A separator was manufactured by the same process as that in Example 3 except that a die gap was 3.0 mm, a thickness of a precursor film was 15 μm, a final winding speed of the precursor film was adjusted to 18 m/min, and a distance of a frost line was 12 cm. Air permeability (Gurley, sec) per unit thickness of the separator manufactured as described above was 28.8 sec/μm.

TABLE 1

| Category | Example 1 | Example 2 | Example 3 | Example 4 |
|---|---|---|---|---|
| Configuration of Layer | PP/PE/PP | PP/PE/PP | PP/PE/PP | PP/PE/PP |
| Thickness of Precursor Film (μm) | 15 | 15 | 10 | 25 |
| MI of PP Resin | 2.0 | 3.0 | 2.0 | 2.0 |
| MI of PE Resin | 0.7 | 0.35 | 0.35 | 0.35 |
| MI ratio | 2.86 | 8.6 | 5.7 | 5.7 |
| DDR | 200 | 200 | 450 | 120 |
| $V_f$ | 30 | 30 | 75 | 30 |
| Distance of Frost Line | 0.10 | 0.10 | 0.10 | 0.12 |
| DDS of Melt* | 500 | 500 | 2813 | 250 |
| Thickness of Separator (μm) | 12.0 | 12.3 | 8.5 | 19.6 |
| Air permeability per unit thickness (Gurley) (sec/μm) | 15.7 | 11.1 | 9.9 | 19.2 |

*DDS of Melt = DDR × $V_f$/(120 × d)
** (DDR) = D/t × 1000
(D (mm) is a die gap, t (μm) is a thickness of a film, $V_f$ (m/min) is a final winding speed of the film, and d (m) is a distance from a die exit to a frost line of the film.)

TABLE 2

| Category | Comparative Example 1 | Comparative Example 2 | Example 5 | Example 6 |
|---|---|---|---|---|
| Configuration of Layer | PP/PE/PP | PP/PE/PP | PP/PE/PP | PP/PE/PP |
| Thickness of Precursor Film (μm) | 15 | 15 | 33 | 15 |
| MI of PP Resin | 4.0 | 1.5 | 2.0 | 2.0 |
| MI of PE Resin | 0.35 | 1.0 | 0.35 | 0.35 |
| MI ratio | 11.4 | 1.5 | 5.7 | 5.7 |
| DDR | 200 | 200 | 91 | 200 |
| $V_f$ | 30 | 30 | 66 | 18 |
| Distance of Frost Line | 0.10 | 0.10 | 0.10 | 0.12 |
| DDS of Melt* | 500 | 500 | 500 | 150 |
| Thickness of Separator (μm) | 11.1 | 11.3 | 25.7 | 11.7 |
| Air permeability per unit thickness (Gurley) (sec/μm) | 81.7 | 57.5 | 24.7 | 28.8 |

*DDS of Melt = DDR × $V_f$/(120 × d)
** (DDR) = D/t × 1000
(D (mm) is a die gap, t (μm) is a thickness of a film, $V_f$ (m/min) is a final winding speed of the film, and d (m) is a distance from a die exit to a frost line of the film.)

As shown in Table 1 and 2, it was confirmed that in Examples 1 to 6 according to the present invention, air permeability of the separator was significantly improved as compared to Comparative Examples 1 and 2. On the other hand, it may be appreciated that in Examples 5 and 6, even though the melt index ratio of the polypropylene resin and the polyethylene resin was adjusted, air permeability was slightly deteriorated due to a low draw down ratio or a low draw down speed of the melt.

The multilayer separator manufactured by the method according to the present invention may improve interlayer peel strength and have excellent permeability due to the high degree of alignment, such that the multilayer separator may be usefully used in a separator for a battery and various filters.

Hereinabove, although the present invention is described by the exemplary embodiments, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

What is claimed is:

1. A method of manufacturing a multilayer separator, the method comprising:
   manufacturing a precursor film by co-extruding and molding a polypropylene based resin melt having a melt index (2.16 kg, 230° C.) of 0.3 to 5 g/10 min and a polyethylene based resin melt having a melt index (2.16 kg, 190° C.) of 0.1 to 1.5 g/10 min so as to be alternately laminated; and
   heat-treating and stretching the manufactured film,
   wherein a melt index ratio (A/B) of the polypropylene based resin melt (A) and polyethylene based resin melt (B) is 2 to 10, and
   the manufacturing of the precursor film is performed in a range in which the draw down speed of the resin melt is 160 to 3,000 l/sec., wherein the draw down speed, DDS, is defined by the following equation:

$$DDS(l/sec.)=D/t \times 1000 \times V_f/(2 \times d)/60 = DDR \times V_f/(120 \times d),$$

where,
D is the die gap in mm;
t is the thickness of film in μm;
$V_f$ is the final winding speed of the film in m/min;
d is the distance from an exit of a die to a frost line of the film in m; and
DDR is the draw down ratio.

2. The method of claim 1, wherein in the manufacturing of the precursor film, the molding is performed in a range in which a draw down ratio is 100 to 450, wherein the draw down ratio, DDR, is defined by the following equation:

$$DDR = D/t \times 1000,$$

where,
D is the die gap in mm; and
t is the thickness of film in μm.

3. The method of claim 1, wherein in the manufacturing of the precursor film, the molding is performed by a casting method.

* * * * *